March 25, 1924.
C. F. SWISSGABEL
1,488,221
DRILL PRESS CHUCKING VISE
Filed Aug. 27, 1920 3 Sheets-Sheet 3
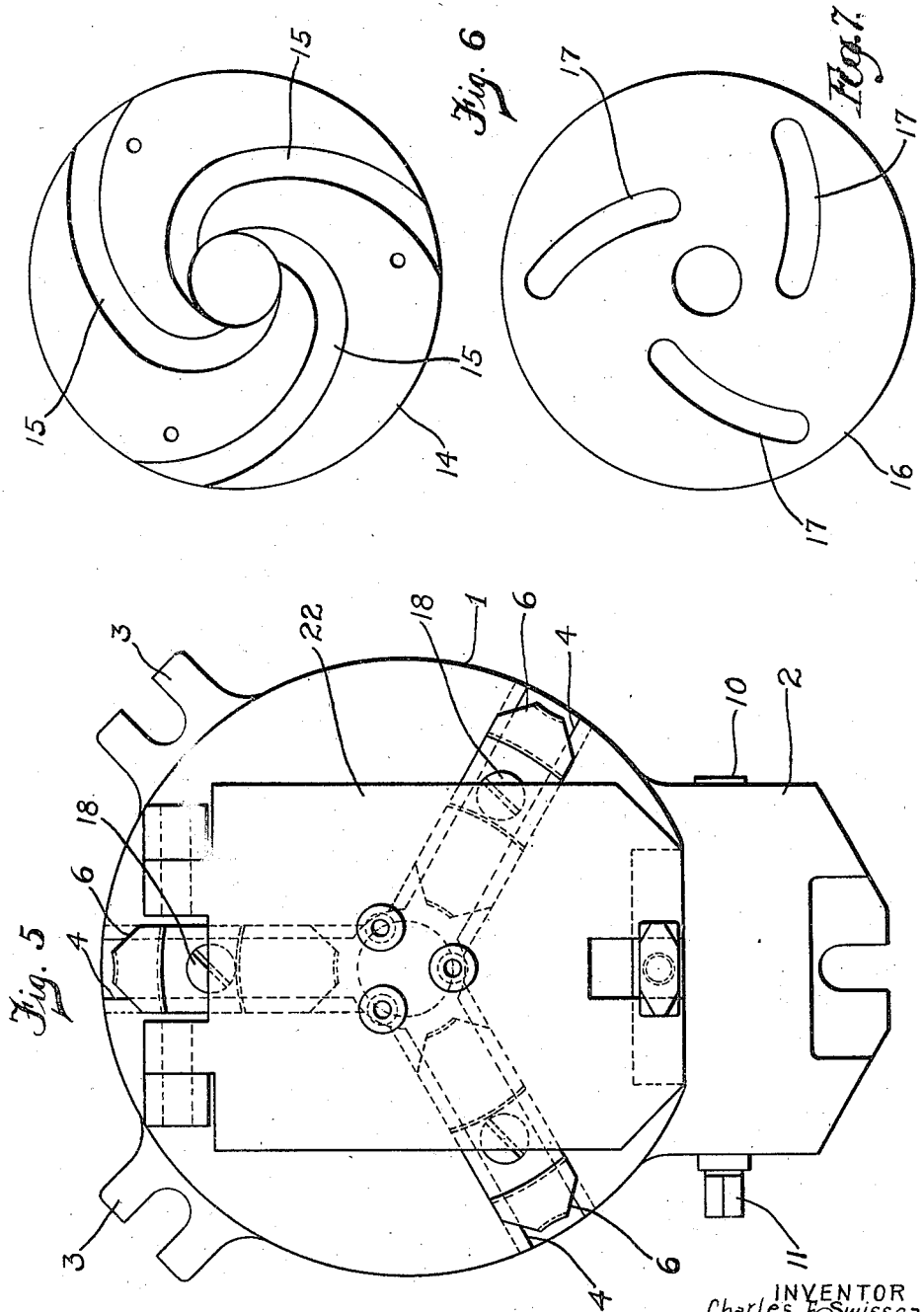
INVENTOR
Charles F. Swissgabel.
BY
ATTORNEY Patented Mar. 25, 1924.

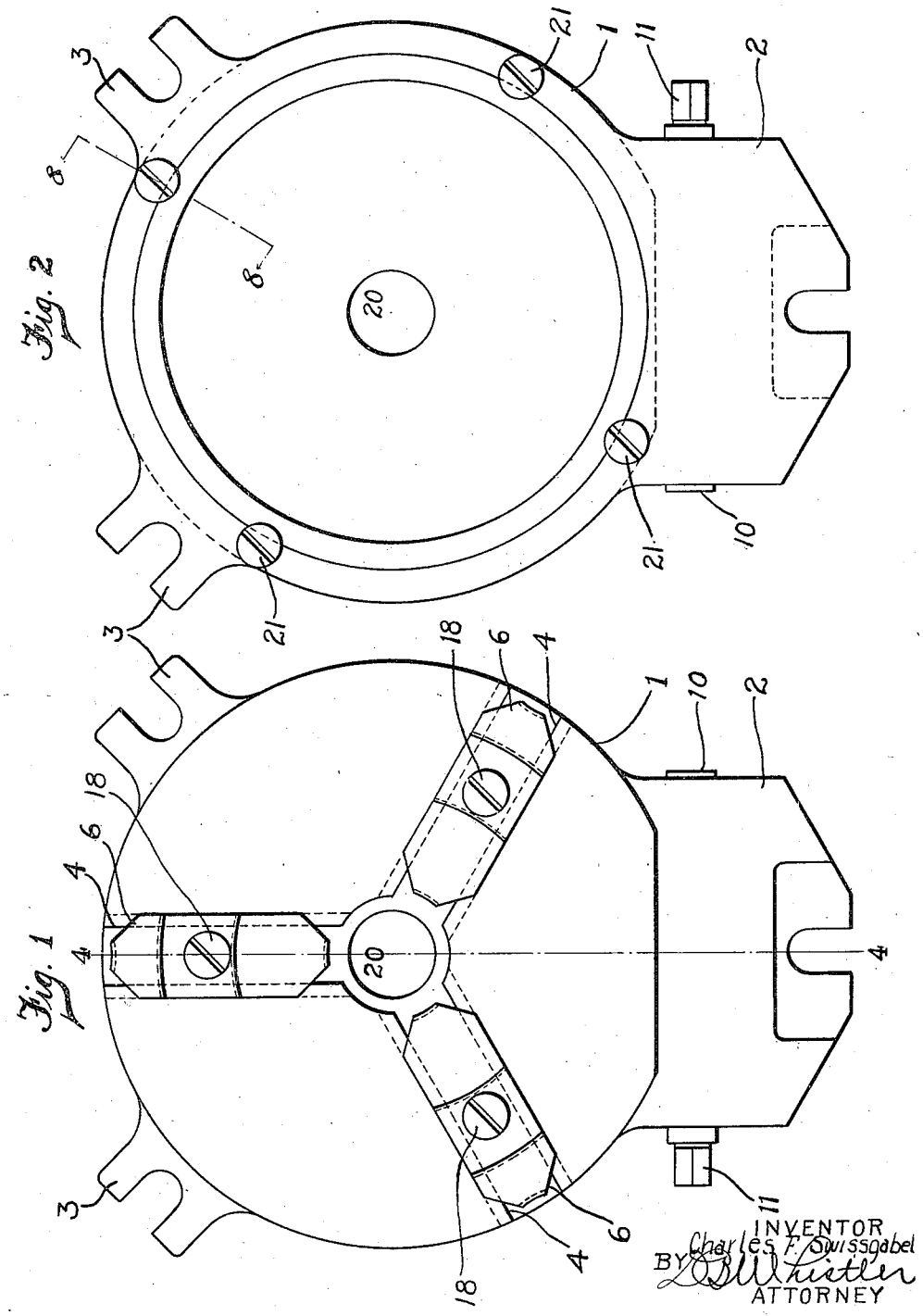

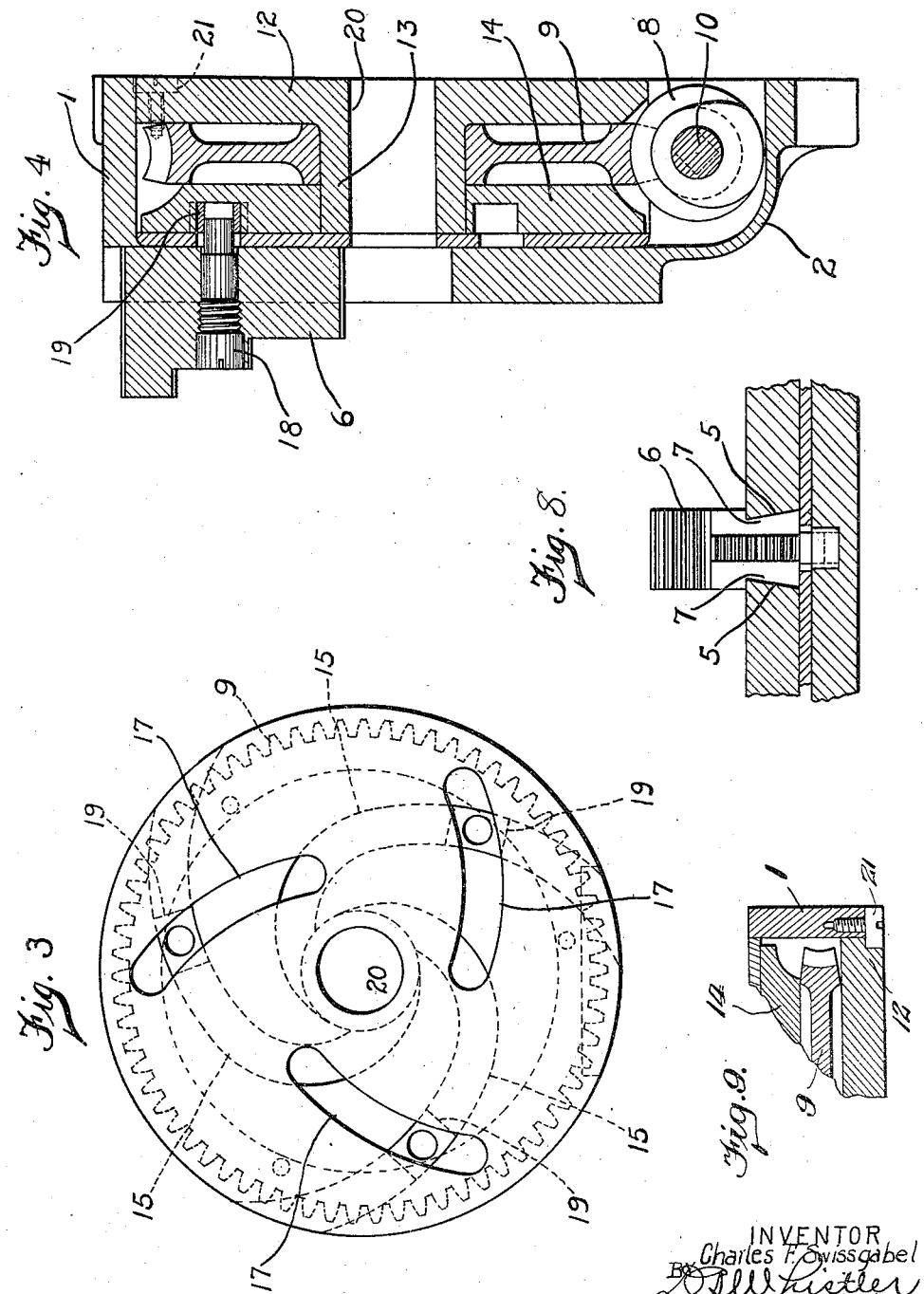

1,488,221

UNITED STATES PATENT OFFICE.

CHARLES F. SWISSGABEL, OF DAYTON, OHIO.

DRILL-PRESS CHUCKING VISE.

Application filed August 27, 1920. Serial No. 406,518.

*To all whom it may concern:*

Be it known that I, CHARLES F. SWISSGABEL, a citizen of the United States, residing at Dayton, in the county of Montgomery and State of Ohio, have invented certain new and useful Improvements in Drill-Press Chucking Vises, of which the following is a specification, reference being had therein to the accompanying drawings.

This invention relates to improvements in drill press chucking vises, having particular reference, in the form here shown, to a manually operable chucking vise for drill press operation which will be adaptable for a wide range of work which under present common practice requires more expensive tools, as jigs and other drill press fixtures, to properly support the work while the machining operations are being performed.

An object of the invention is to provide a chucking vise of the above character which will be of improved and simple substantial construction and adapted for expeditious handling of work, the chuck being practically universal in its adaptability to the class of drill press work which is usually performed with the use of ordinary drill press fixtures. Drill press tool fixtures of the usual type will not be required at all for much of the work where the improved chucking vises are used, and, where fixtures are required, the same will be of simpler and cheaper construction.

A further object of the invention consists in providing means for excluding dirt, as metal chips, borings, scale, etc., from the working parts of the chuck. Thus the mechanism will be protected against injury and excessive wear, and the chuck will be operable under all conditions with greater ease.

In the preferred form of construction, as here shown, certain of the chuck mechanism, such as the locking mechanism thereof, herein shown as consisting of worm gearing, may consist of standard commercial parts. Thus the manufacturing and maintenance costs of the chuck will be cheapened without affecting unfavorably its construction and operation.

While the chuck as herein illustrated and described is in the form required for drill press operations, it will be observed by those experienced in this art, that the chuck is equally adaptable for boring mill work and with suitable modifications made in its locking mechanism that the same principle of construction which characterizes the invention may also be applied to lathe chucks, thus to adapt the chucks to all the varied work for which ordinary chucks may be used.

In the drawings:

Fig. 1 is a top plan view of the improved chucking vise;

Fig. 2 is a bottom plan view;

Fig. 3 is a plan view of the chuck mechanism removed from the main casing;

Fig. 4 is a vertical sectional view taken on the line 4—4 of Fig. 1;

Fig. 5 is a plan view of the chuck having a bushing or jig plate applied thereto;

Fig. 6 is a detail view of the jaw actuating plate;

Fig. 7 is a detail view of the chuck actuating mechanism cover plate,

Fig. 8 is a detail of a chuck jaw and cooperation parts.

Fig. 9 is a detail view taken on line 8—8 of Fig. 2, means provided for adjusting the bottom of the chuck and mechanism supported thereon relative to the chuck housing.

As here shown, the improved chucking vise consists of a main casing 1, having an outwardly projecting portion 2 in which the actuating member of the chuck locking mechanism is mounted, and outwardly projecting, slotted lugs 3 whereby the chuck may readily be secured to a drill press table. Radial grooves 4, constituting ways for the chuck jaws 6 are formed in the upper face of the chuck in the usual manner, except that the opposite side faces 5 of the grooves are inclined outwardly toward the bottom of the groove, the side working faces 7 of the jaws being shaped at a corresponding angle to fit the inclination of the grooves for a purpose which will presently be described.

As best shown in Fig. 4, the operable parts of the chuck consist of the chuck locking mechanism comprising worm gearing 8—9, worm 8 being secured to an actuating shaft 10 mounted in the casing extension 2 and having a squared end 11 to which a wrench or other suitable tool may be applied for adjusting the chuck jaws, and gear 9 being mounted to rotate freely on a bearing sleeve 13 extending upwardly from the chuck bottom plate 12; a cam disc 14 rigidly secured to gear 9 and having curved slots or cam races 15 extending outwardly from the center of the disc to the periphery of the disc, the cam races being equal in number to the chuck jaws 6; a cam disc 16 resting upon disc 14, adapted to rotate on bearing sleeve 13 and being provided with cam slots 17 which are curved outwardly, as here shown, at substantially the same degree as the slots 15 but in the inverse direction; the chuck jaws 6 which slide freely on cam disc 16, and jaw stud bolts 18 threaded into the chuck jaws and cooperating with the slots 15 and 17 of the cam discs, cam blocks 19 operable in slots 15 and lying flush with disc 14 acting to receive the free ends of the stud bolts 18.

By the arrangement of the mechanism as above described, it will be observed that the opposite planes of movement of cam slots 15 and 17 intersect at all times one with the other at the points where the chuck jaw stud bolts 18 register with the slots, the point of intersection being covered by the chuck jaws which are in sliding contact with upper disc 16; thus no portion of either the upper or lower cam slots will be open to the grooves of the chuck casing, as upper disc 16 will act to close the grooves 4 at the bottom, except at the point of juncture of the cam slots 15 and 17 which, as above stated, is covered by the chuck jaws. Thus the chuck will be in effect self-cleaning, as disc 16 will act to exclude all foreign substances, as chips, borings, scale, etc., from the inner mechanism, such materials being discharged from the chuck in most part through a clearance aperture 20 formed at the center of the chuck.

From the foregoing detailed description of construction the operation of the improved chucking vise will readily be understood which, briefly stated, is as follows:

Upon actuation of worm 8, gear 9 and cam disc 14 will be rotated and adjustment of the chuck jaws will be effected through the stud bolts 18 which connect the jaws to the disc 14, the jaws being moved toward or away from center according to the direction gear 8 is operated.

With the movement of the chuck jaws, by means of the connection of the jaw stud bolts 18 with cam slots 17, disc 16 will be rotated in the direction opposite to the direction of movement of disc 14, and grooves 4 will be kept closed, as above stated upon adjustment of the jaws in either direction.

The angular faces 5 of the grooves 4 and the corresponding angular faces 7 of the chuck jaws provide means for adjusting the jaws vertically in the grooves to compensate for wear, etcetera. To this end the bottom plate 12 is supported in the chuck casing by adjusting screws 21 threaded into the bottom edge of casing—1 and having their heads projecting over the edge of plate 12 as shown in Fig. 2 of the drawings, whereby vertical adjustment of the plate and the parts supported thereon may be effected; thus proper working relation between the jaws and grooves 4 may be maintained.

As illustrated in Fig. 5 a suitable jig plate 22 may readily be applied to the chuck for any given piece of work. As here shown, the part to be drilled will be located and supported by means of the chuck jaws, and the jig plate will be brought to position ready for the drilling operation. The adaptability of the chuck for a wide range of ordinary drill work with simple fixtures of this character, or without additional fixtures of any kind, will be readily understood by those experienced in this art without further illustration or detail description.

Having illustrated and described my invention, I claim:

1. A chucking vise, including in combination with an inverted housing constituting a vise mounting base, chuck jaws operably mounted in said base, a bottom closure for the housing having a bearing thereon, chuck jaw actuating mechanism supported on said bearing, including a disc having cams formed therein and operably connected thereby to said jaws, a second disc operable in a direction opposite to said cam disc and coacting therewith to exclude foreign substances from the chuck mechanism, and operating connections for said chuck actuating mechanism.

2. In a chucking vise, the combination with a casing, having a plurality of radial channels formed in one face thereof, and a chuck jaw operable in each of said channels, of adjusting mechanism for said jaws comprising a cam disc connected to actuate the jaws, and a disc interposed between the jaws and said disc and operable to close the bottom of said channels when the jaws are adjusted.

3. In a chucking vise, the combination with a casing, having a plurality of radial channels formed in one face thereof, and a chuck jaw operable in each of said channels, of adjusting mechanism for said jaws comprising a rotatable cam disc operable to actuate the jaws, and a rotatable plate operable in a direction opposite to the disc to close the bottom of said channels when the jaws are adjusted.

4. In a chucking vise, the combination with a casing, having a plurality of radial channels formed in one face thereof, and a chuck jaw operable in each of said channels, of adjusting mechanism for said jaws comprising interlocked gearing, a rotatable cam disc secured to said gearing and operable to actuate the jaws, and a rotatable plate interposed between the jaws and said disc and operable to close the bottom of said channels when the jaws are adjusted.

5. In a chucking vise, the combination with a casing, having a plurality of radial channels formed in one face thereof, and a chuck jaw operable in each of said channels, of adjusting mechanism for said jaws comprising a disc having a plurality of cam slots, one for each jaw, extending therein tangentially to the plane of movement of said jaws, a plate mounted to rotate upon said disc between the jaws and the disc, and having a corresponding number of inverse tangential cam slots intersecting the plane of the slots of said disc, and common connections between the jaws and the cams of said disc and plate whereby said plate will be actuated in a direction opposite to the movement of the disc when the disc is actuated to adjust the jaws.

6. In a chucking vise, the combination with a casing, having a plurality of radial channels formed in one face thereof, and a chuck jaw operable in each of said channels, of adjusting mechanism for said jaws comprising a disc having a plurality of curved cam slots connected to the jaws, a plate interposed between the jaws and said disc to close the bottom of said channels and having a like number of equally curved inverse cam slots intersecting the plane of the slots of the disc at points covered by the jaws, and a stud bolt for each jaw registering with cooperating slots of the disc and plate at the point of their intersection, whereby said plate will be actuated in a direction opposite to the movement of the disc when the disc is actuated to adjust the jaws.

7. In a chucking vise, the combination with a casing, of work securing means supported in said casing, mechanism for locking and releasing said securing means including an open-cam disc, and means operable in said casing including a disc superposed upon the cam disc and acting to exclude foreign substances from certain of the chuck mechanism.

In testimony whereof, I affix my signature.

CHARLES F. SWISSGABEL.